United States Patent [19]

Meyer et al.

[11] Patent Number: 4,918,148

[45] Date of Patent: Apr. 17, 1990

[54] POLYAMIDE MODIFIED WITH MONOISOCYANATES

[75] Inventors: Rolf-Volker Meyer, Krefeld; Josef Merten, Korschenbroich; Rolf Dhein; Harald Selbeck, both of Krefeld, all of Fed. Rep. of Germany

[73] Assignee: Bayer Aktiengesellschaft, Leverkusen, Fed. Rep. of Germany

[21] Appl. No.: 252,763

[22] Filed: Oct. 3, 1988

Related U.S. Application Data

[63] Continuation-in-part of Ser. No. 854,086, Apr. 21, 1986, abandoned.

[30] Foreign Application Priority Data

May 4, 1985 [DE] Fed. Rep. of Germany ....... 3516089

[51] Int. Cl.$^4$ .............................................. C08G 69/48
[52] U.S. Cl. ..................................... 525/424; 524/196
[58] Field of Search ......................... 525/424; 524/196

[56] References Cited

U.S. PATENT DOCUMENTS

| | | | |
|---|---|---|---|
| 2,333,914 | 11/1943 | Berchet | 525/424 |
| 3,545,911 | 12/1970 | Papero et al. | 525/424 |
| 3,668,171 | 6/1972 | Sims | 524/196 |
| 3,867,352 | 2/1975 | Aramatsu et al. | 525/424 |
| 4,600,752 | 7/1986 | Meyer et al. | 525/424 |

FOREIGN PATENT DOCUMENTS 0013697 2/1975 Japan .................................. 525/424

*Primary Examiner*—Harold D. Anderson
*Attorney, Agent, or Firm*—Connolly and Hutz

[57] ABSTRACT

The reaction of—preferably partially crystalline—polyamides with monoisocyanate or monoisocyanate precursors gives products having improved flowability, mould release and/or notched impact strength.

14 Claims, No Drawings

POLYAMIDE MODIFIED WITH MONOISOCYANATES

This is a continuation-in-part of application Ser. No. 854,086 filed Apr. 21, 1986, now abandoned.

The invention relates to impact-resistant polyamide moulding compositions which contain 0.1 to 5% by weight of monoisocyanates and which are distinguished, for example, by improved flow properties and/or improved mould-release behaviour.

The impact strength of polyamide mouldings depends considerably on the water content of the mouldings. In the anhydrous state, for example after the production of the mouldings by injection-moulding, particularly the mouldings produced from readily flowable and hence easily processable polyamide injection-moulding compositions of medium molecular weights, and here again those produced from highly crystalline polyamides, are relatively sensitive to impact stress.

Higher-molecular polyamides, such as are preferably employed for processing by extrusion, admittedly give mouldings which are less impact-sensitive, but they are more difficult to process because of their sharply increased melt viscosity and the poorer flowability resulting from the latter.

Furthermore, the preparation of higher-viscosity polyamides frequently requires an expensive and involved after condensation in solid phase.

There is therefore a requirement for rapidly processable, readily flowable polyamide moulding compositions, from which mouldings can be produced which have an increased impact strength in the dry state. In particular, those polyamides are of interest which have a high tensile strength and easy processability combined with a high impact strength.

Various processes for increasing the impact strength of polyamides are already known, such as, for example, the admixture of low-molecular plasticizers into polyamides, but this does not lead to a satisfactory solution of the problem for several reasons. The great majority of the plasticizers suitable for plastics is not sufficiently compatible with polyamides, and the plasticizers segregate on processing or tend to exude. However, compatible plasticizers which form true solutions with polyamides lead in most cases to a deterioration of the good mechanical properties of the polyamides. Highly polar substances of low molecular weight, such as water or dimethylformamide, admittedly effect an improvement in impact strength. However, they can be incorporated into polyamide mouldings only after the latter have been produced, since otherwise blister-containing mouldings would be formed during the processing of correspondingly pretreated polyamide granules, because of the relatively low boiling points of these additives.

Additives for improving the flowability and the mould-release behaviour of polyamide mouldings have also been known for a long time.

Thus, for example, both amide waxes and ester waxes are known for improving the mould-release behaviour, but these do not lead to improved flowability. Inorganic nucleating agents are also used as mould-release agents, but as a rule these adversely affect the notched impact strength of (partially crystalline) polyamides and can therefore also be used only to a limited extent.

Ca salts of long-chain carboxylic acids, preferably Ca stearate, are particularly effective as mould-release aids and flow improvers. However, these cause a marked degradation of the molecular weight of the polyamides, which in turn leads to an undesired reduction in the impact strength level.

For the preparation of polyamides by activated, anionic polymerization of lactams, (poly)isocyanates are employed as "activators", which considerably accelerate the polymerization. Particularly high-grade products are obtained with (poly)isocyanates-which contain at least 2 NCO groups per molecule.

It is also known from DE-OS (German Published Specification) 3,023,918 to improve the flowability and impact strength of polyamides by incorporating oxicarbonyl isocyanates of polyethers into the polyamide moulding compositions.

However, the preparation of such modifiers is complicated, they make great demands on storage conditions and do not always effect the requisite improvements in impact strength.

SurprisingLy, it has now been found that polyamide moulding compositions which do not have the above-mentioned disadvantages can be obtained, when polyamides, preferably partially crystalline polyamides, are reacted with relatively small quantities of monoisocyanates or monisocyanate precursors such as, for example, masked monoisocyanates, moulding compositions with improved flowability, better mould release and/or better notched impact strength being obtained depending on the choice of the monoisocyanates.

It is particularly surprising, that the remaining properties of the polyamides are not adversely affected but, for example, the high level of notched impact strength can be preserved coupled with improved mould-release behaviour and increased flowability.

The invention therefore relates to thermoplastically processable polyamide moulding compositions into which 0.1 to 5% by weight, preferably 0.5 to 3% by weight, of at least one organic monoisocyanate of the general formula

R—NCO the isocyanate group being linked directly to the radical R which has at least 6 and preferably at least 10 C atoms and represents a (cyclo)aliphatic, preferably $C_6$–$C_{50}$ hydrocarbon radical, an araliphatic, preferably $C_7$–$C_{50}$ hydrocarbon radical or an aromatic, preferably $C_6$–$C_{50}$ hydrocarbon radical, it being possible for each of the radicals to be at least mono-substituted in one or more positions, with radicals other than NCO for example by halogens, preferably chlorine or bromine, or to contain bridge members such as —S—, —O—, —CONH—, preferably —O— and/or —CONH—, are incorporated.

Aliphatic monoisocyanates having at least 10 C atoms in the hydrocarbon radical R or aromatic monoisocyanates, which contain at least one substituent with at least $C_4$ on the aromatic ring, are particularly preferably employed for modifying the polyamides according to the invention.

Examples of the said monoisocyanates are hexyl isocyanate, 6-chlorohexyl isocyanate, n-octyl isocyanate, cyclohexyl isocyanate, 2-ethylhexyl isocyanate, 2,3,4-methylcyclohexyl isocyanate, 3,3,5-trimethylcyclohexyl isocyanate, 2-norbornyl-methyl isocyanate, decyl isocyanate, dodecyl isocyanate, tetradecyl isocyanate, hexadecyl isocyanate, octadecyl isocyanate, 3-butoxypropyl isocyanate, 3-(2-ethylhexyloxy)-propyl isocyanate, phenyl isocyanate, tolyl isocyanates, chlorophenyl isocyanates (2,3,4-isomers), dichlorophenyl isocyanates, 4-nitrophenyl isocyanate, 3-trifluoromethylphenyl isocyanate, benzyl isocyanate, dimethylphenyl isocyanates (technical mixture and individual isomers), 4-dodecylphenyl isocyanate, 4-cyclohexylphenyl isocyanate, 1-naphthyl isocyanate, isocyanate amides from 1 mol diisocyanate and 1 mol of monocarboxylic acids, preferably from toluylene diisocyanates, diphenylmethane diisocyanates and hexamethylene diisocyanate with aliphatic monocarboxylic acids having preferably at least 6 C atoms, for example (6-isocyanatohexyl)-stearic acid amide, (3-isocyanatotolyl)-stearic acid amide or (6-isocyanatohexyl)-benzamide, in each case by themselves or as a mixture with several monoisocyanates.

Monoisocyanates which are to be employed preferably are dodecyl isocyanate, tetradecyl isocyanate, octadecyl isocyanate, the technical stearyl isocyanate (mixture of $C_{12-18}$-alkyl isocyanates), nonylphenyl isocyanates, dodecylphenyl isocyanates, (3-isocyanatotolyl)-stearylamide and chlorophenyl isocyanates.

As the polyamides within the meaning of the invention, linear polycondensates of lactams having 4 to 12 carbon atoms or customary polycondensates obtained from diamines and dicarboxylic acids, such as polyamide-6, -6,6, -6,8, -6,9, -6,10, -6,12, -8,8, -11 or -12, or polycondensates obtained from aromatic dicarboxylic acids, such as isophthalic acid and terephthalic acid, with diamines such as hexamethylenediamine and octamethylenediamine, from araliphatic starting materials, such as m- or p-xylylenediamine, and adipic acid, suberic acid and sebacic acid, and polycondensates based on alicyclic starting materials such as cyclohexanedicarboxylic acid, cyclohexanediacetic acid, diamino-dicyclohexyl methanes and isophoronediamine, can be used.

Mixtures of the said polyamides or copolyamides obtainable from the said components can likewise be used. The softening points of the starting polyamides should be at least 150° C. Preferably, partially crystalline polyamides are used.

Particularly, preferably, the polyamides-6, -6,6, -6,9, -6,10, -6,12, -11 and -12, customarily employed for industrial injection-moulded articles, as well as copolyamides, a predominant part of which is built up on the basis of the abovementioned polyamides and the relative viscosity of which is generally about 1.8 to 5.0, preferably 2.0 to 3.5 (measured in a 1% solution in m-cresol at 25° C.), are used.

The monoisocyanates to be used according to the invention are added to the polyamides in quantities of 0.1 to 5% by weight, preferably in quantities of 0.5 to 3% by weight.

For preparing the modified polyamides according to the invention, the polyamide component and the monoisocyanate can be mixed with one another above the melting point of the polyamide. This can be carried out, for example, immediately after the preparation of the polyamide, by mixing the modifier with the melt to be spun off as a strand. Preferably, the polyamides modified according to the invention are prepared by mixing the starting components in known screw machines.

This process is chosen in particular when, in addition to the polyamides, further polymers are employed for the preparation of correspondingly modified polymer blends or other additives, such as stabilizers, mould-release agents, lubricants, crystallization accelerators, plasticizers, pigments, dyestuffs, reinforcing agents and/or fillers, such as glass fibres, are to be incorporated.

In the desired combination with other additives, which carry groups capable of reacting with isocyanates, for example a large number of glass fibre layers, it can be advantageous or even necessary to incorporate the other additives in the second working step—separately from the monoisocyanates.

Usual, known types of apparatus are suitable for compounding. Twin-screw extruders are preferably employed.

Many of the polyamide moulding compositions modified according to the invention with monoisocyanates are products which flow particularly readily and which can be processed without problems in commercially available injection-moulding machines to give mouldings. Some of them are additionally distinguished by improved notched impact strength values, in addition to the other good use properties typical for polyamides.

Many monoisocyanates as polyamide modifiers additionally promote the mould-release behaviour of the polyamides so that the use of additional mould-release aids, which frequently also have adverse effects on the use properties of the polyamides, can advantageously be ommitted.

Finally, mouldings obtained from polyamides modified with monoisocyanates are also distinguished by a very good surface quality.

EXAMPLES

Example 1

98 parts by weight of a polyamide 6 having a relative viscosity of 3.0, measured in 1% solution in m-cresol at 25° C., a notched impact strength of 3.1 kJ/m$^2$ determined according to DIN 53 453, and a flow length of 52 cm, and 2 parts by weight of n-octadecyl isocyanate are separately extruded at 260° C. and 90 rpm by means of a weigh feeder and a metering pump respectively, and the homogeneous melt is spun off into a water bath as strands which are granulated and then dried at 80° C. in vacuo down to a water content of <0.05% by weight.

The product has a relative viscosity of 2.7, a notched impact strength of 4.5 k/J/m$^2$ and a flow length of 80 cm; that is to say, at a slightly reduced molecular weight and a trend to an increased notched impact strength, the flowability as a measure of processability has been drastically improved.

The flow length is a measure of the flowability of a product and hence of its processability; a greater flow length means better flowability and hence shorter injection cycles.

The flow length is determined as follows: the sample to be investigated is injected under an injection pressure of 72 bar into a special mould kept at 90°, by means of an injection-moulding machine, the barrel temperature of which is 260° C. Materials of particularly soft flow are capable to fill the mould under these conditions, so that afterwards a 100 cm long spiral can be taken out. Materials of less soft flow only partially fill the mould under the conditions described; due to the premature solidification of the melt, only spiral bodies of <100 cm length can then be obtained.

That length in cm is given as the flow length which was reproduced 5 times.

In addition, the ease of the mould release of mouldings is considerably improved as compared with the unmodified comparison sample.

Example 2-7

The experimental procedure described in Example 1 is repeated, the quantity and the type of the monoisocyanate added being varied.

The composition of the products and characterizing properties are summarized in Table 1.

Examples 8-10

The experimental procedure described in Example 1 is repeated with "technical steary isocyanate" (additive A) and various polyamides.

The composition of the products and characterizing properties are summarized in Table 2.

lands) were simultaneously fed via separate weigh feeders into a mixing extruder and compounded at 270° C. to give a glass fibre-containing polyamide.

The glass fibre-containing melt is spun off, as described in example 1, as a strand which is granulated and thoroughly dried.

The comparison of the characteristic product data of the product thus obtained with an analagous glass fibre-reinforced polyamide (CT 2) not containing additive A show the following differences in the processing data:
Flow length 56 cm (CT 2: 43 cm)
Mould-release pressure 0.3 MPa (CT 2: 0.6 MPa)
Temperature limit for sticking 189° (CT 2 168°)

The temperature limit for sticking is understood as

TABLE 1

Modification of polyamide 6 ($\eta_{rel}$ = 2.9, flow length = 52 cm) by various monoisocyanate additives (sum of the parts by weight = 100)

| Example | Additive Type* | quanity | $\eta_{rel}$ | Notched impact strength $a_k$ (kJ/m$^2$) | Flow length cm | Mould-release pressure** (MPa) |
|---------|----------------|---------|--------------|------------------------------------------|----------------|--------------------------------|
| 2 | A | 2 | 2.7 | 4.5 | 81 | 0.5 |
| 3 | A | 1 | 2.8 | 4.1 | 75 | 0.7 |
| 4 | B | 2 | 2.9 | 4.1 | 72 | 0.6 |
| 5 | C | 2 | 2.9 | 4.5 | 72 | 0.5 |
| 6 | D | 2 | 2.5 | 4.2 | 73 | 1.0 |
| 7 | E | 2 | 2.7 | 4.4 | 80 | 1.0 |
| CT$^1$ | none | — | 2.9 | 3.4 | 52 | 1.5–9.0 (not releasable from the mould) |

*A: Mixture of even-numbered alkyl isocyanates (about 55% of C$_{18}$, about 35% of C$_{16}$, about 10% of C$_{10}$–C$_{14}$)

B: 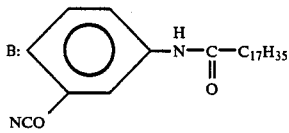

C: 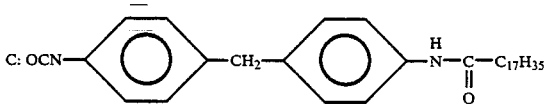

D: 3-chlorophenyl isocyanate
E: Benzyl isocyanate
**For explanations, see page 11)
**Mould-release pressure The mould-release pressure, important for the degree of ease of mould release, was measured as follows: The individual granulated polyamide products were processed into 20 cylindrical "mould-release sleeves" while constantly maintaining a defined barrel temperature, mould temperature, injection pressure, hold-on pressure, injection time, cooling time, hold-on pressure time and pause time.
The indicated values of the mould-release pressure are the arithmetic mean from 20 cycles. The lower the mould release pressure required under standard conditions for ejection of the specimens, the greater is the ease of mould release of the corresponding product. For polyamide 6 products, for example, the following machine data were given:

Barrel temperature:  250° C. (270° C. in the case of polyamide 6 + 30% of glass fibres)
Injection pressure:  60 MPa
Hold-on pressure:  30 MPa
Cycle times:  Injection time  6.15 seconds
             Cooling time  10 seconds
             Hold-on pressure time  15 seconds
             Pause time  3 seconds
Mould temperature:  110° C.

TABLE 2

Modification of various polyamides with 2% of additive A as the monoisocyanate

| | Polyamide employed | | | | | Additive A as in example 2 (parts by weight) | Product properties | | |
|---------|------|--------------|----------------|--------------------|----------------|----------------------------------------------|--------------|-----------------|----------------|
| Example | Type | $\eta_{rel}$ | Parts by weight | $a_k$ (kJ/m$^2$) | Flow length cm | | $\eta_{rel}$ | $a_k$ (kJ/m$^2$) | Flow length cm |
| 8 | PA 6,6 | 3.0 | 98 | 2.5 | 65 | 2 | 2.7 | 3.6 | 77 |
| 9 | PA 6,9 | 3.5 | 98 | 3.9 | 45 | 2 | 3.5 | 5.6 | 65 |
| 10 | PA 6 | 3.9 | 98 | 4.2 | 32 | 2 | 3.6 | 5.2 | 45 |
| 11 | PA 6 | 2.9 | 98*** | 2.9 | 76 | 2 | 2.8 | 3.8 | 99 |

$a_k$ = notched impact strength (determined according to DIN 53 453)
***contains 1% of long-chain stearyl ester as a processing aid

Example 12

The higher this temperature limit, the greater the ease of processing the products.

Comparison test 3

A glass fibre-reinforced polyamide 6 which has been prepared according to Example 12 and, in place of the additive A, contains 2% of a polyethylene glycol (molecular weight about 1,500) terminated with —O—CO—NCO end groups according to Example 9 of DOS (German Published Specification) 3,023,918, had a flow length (43 cm) unchanged as compared with the unmodified product, and a temperature limit for sticking of only 164° C.

We claim:

1. A thermoplastically processable polyamide molding coposition obtained by melt blending 95.5 to 97% by weight of a polyamide with 0.5 to 3% by weight of at least one organic monoisocyanate of the formula where R is (i) a hydrocarbon radical containing at least six carbon atoms selected form an aliphatic radical, a cycloaliphatic radical, an araliphatic radical or an aromatic radical, (ii) a substituted hydrocarbon radical containing at least six carbon atoms selected from a substituted aliphatic radical, a substituted cycloaliphatic radical, a substituted araliphatic radical or a substituted aromatic radical or (iii) an organic radical comprised of a hydrocarbon radical (i), (ii) or a mixture thereof and bridging members selected from sulfur, oxygen or amide groups where the R does not include any additional NCO groups.

2. A thermoplastically processable polyamide molding composition obtained by melt blending 95.5 to 97% by weight of a polyamide with 0.5 to 3% by weight of at least one organic monoisocyanate of the formula

R—NCO formed by reacting 1 mole of (i) a monocarboxylic acid containing six carbon atoms selected from an aliphatic carboxylic acid, a cycloaliphatic carboxylic acid, an araliphatic carboxylic acid or an aromatic carboxylic acid or (ii) a substituted monocarboxylic acid containing at least six carbon atoms substituted with halogen in one or more positions selected from a substituted aliphatic carboxylic acid, a substituted cycloaliphatic carboxylic acid, a substituted araliphatic carboxylic acid or a substituted aromatic carboxylic acid with 1 mole of an isocyanate selected from toluylene diisocyanates, diphenylmethane diisocyanates or hexamethylene diisocyanates.

3. A thermoplastically processable polyamide molding composition in accordance with claim 1, wherein the substitution is halogen substitution.

4. A thermoplastically processable polyamide molding composition in accordance withh claim 2, wherein the substitution is halogen substitution.

5. A thermoplastically processable polyamide molding composition in accordance with claim 1, wherein R contains at least ten carbon atoms.

6. A thermoplastically processable polyamide molding composition in accordance with claim 2, wherein the substituted or unsubstituted hydrocarbon radical contains at least ten carbon atoms.

7. A thermoplastically processable polyamide molding composition in accordance with claim 1, wherein R is a substituted or unsubstituted aliphatic or cycloaliphatic radical containing from 6 to 50 carbon atoms.

8. A thermoplastically processable polyamide molding composition in accordance with claim 2, wherein R is a substituted or unsubstituted aliphatic or cycloaliphatic radical containing from 6 to 50 carbon atoms.

9. A thermoplastically processable polyamide molding composition in accordance with claim 1, wherein R is a substituted or unsubstituted araliphaic radical containing from 7 to 50 carbon atoms.

10. A thermoplastically processable polyamide molding composition in accordance with claim 2, wherein R is a substituted or unsubstituted araliphatic radical containing from 7 to 50 carbon atoms.

11. A thermoplastically processable polyamide molding composition in accordance with claim 2, wherein the monoisocyanate is selected from hexylisocyanate, 6-chlorohexyl isocyanate, n-octyl isocyanate, cyclohexyl isocyanate, 2-ethylhexyl isocyanate, 2,3,4-methylcyclohexyl isocyanate, 3,3,5-trimethylcyclohexyl isocyanate, 2-norbornyl-methyl isocyanate, decyl isocyanate, dodecyl isocyanate, tetradecyl isocyanate, hexadecyl isocyanate, octadecyl isocyanate, technical stearyl isocyanate (mixture of $C_{12}$–$C_{18}$-alkyl isocyanates), 3-butoxypropyl isocyanate, 3-(2-ethylhexyloxy)-propyl isocyanate, phenyl isocyanate, tolyl isocyanates, chlorophenyl isocyanates (2,3,5-isomers), dichlorophenyl isocyanates, 4-nitrophenyl isocyanate, 3-trifluoromethylphenyl isocyanate, benzyl isocyanate, dimethylphenyl isocyanates (technical mixture and individual isomers), nonyl-phenylisocyanate, dodecyl-phenyl isocyanates,. 4-cyclohexylphenyl isocyanate, 1-naphthyl isocyanate, (6-isocyanatohexyl)-stearic acid amide, (3-isocyanatotolyl)-stearic acid amide, (6-isocyanatohexyl)-benzamide, (3-isocyanatophenyl) stearic amide or 4-monoisocyanate-4'(stearylamido)-diphenyl-methane.

12. A thermoplastically processable polyamide molding composition in accordance with claim 11 wherein the monoisocyanate is selected from dodecyl isocyanate, tetradecyl isocyanate, octadecyl isocyanate, technical stearyl isocyanate (mixture of $C_{12-18}$-alkyl isocyanates), (3-isocyanatotolyl)-stearylamide, chlorophenyl isocyanate, nonyl phenyl isocyanate, dodecylphenyl isocyanate or 4-isocyanate-4'-(stearyl amido)-diphenylmethane.

13. A thermoplastically processable polyamide molding composition in accordance with claim 1, wherein the polyamide is polyamide -6, -6,6, -6,9, -6,10, -6,12, -11 or -12, corresponding copolyamides or mixtures thereof.

14. A pharmaceutically processable polyamide molding composition in accordance with claim 2, wherein the polyamide is polyamide -6, -6,6, -6,9, -6,10, -6,12, -11 or -12, corresponding copolyamides or mixtures thereof.

* * * * *